(12) United States Patent
Jain et al.

(10) Patent No.: US 10,432,776 B1
(45) Date of Patent: Oct. 1, 2019

(54) MANAGING UNANSWERED DIGITAL COMMUNICATIONS

(71) Applicant: Project Affinity, Inc., San Francisco, CA (US)

(72) Inventors: Arzav Jain, San Francisco, CA (US); Hansen Qian, San Francisco, CA (US); Bobby Zhang, San Francisco, CA (US); Craig Dabney, San Francisco, CA (US); Shubham Goel, San Francisco, CA (US)

(73) Assignee: PROJECT AFFINITY, INC., San Francisco, CA (US)

( * ) Notice: Subject to any disclaimer, the term of this patent is extended or adjusted under 35 U.S.C. 154(b) by 0 days.

(21) Appl. No.: 15/963,978

(22) Filed: Apr. 26, 2018

(51) Int. Cl.
*H04M 1/725* (2006.01)
*G06F 17/27* (2006.01)
*H04W 4/14* (2009.01)
*H04L 12/58* (2006.01)
(Continued)

(52) U.S. Cl.
CPC .. *H04M 1/72547* (2013.01); *G06F 16/24578* (2019.01); *G06F 16/435* (2019.01); *G06F 17/27* (2013.01); *H04L 51/046* (2013.01); *H04L 51/24* (2013.01); *H04L 51/26* (2013.01); *H04W 4/14* (2013.01); *H04L 51/22* (2013.01); *H04L 51/34* (2013.01)

(58) Field of Classification Search
CPC .............. H04M 1/72547; G06F 16/435; G06F 16/24578; G06F 17/30029; G06F 17/3053; G06F 17/27; H04L 51/046; H04L 51/24; H04L 67/22; H04L 51/22; H04L 51/34; H04L 51/02; H04L 51/18; H04L 51/12; H04L 51/26; H04W 4/14; H04W 4/12; G06Q 10/107; G06Q 10/10
See application file for complete search history.

(56) References Cited

U.S. PATENT DOCUMENTS

2004/0243679 A1* 12/2004 Tyler .................... G06Q 10/107
  709/206
2014/0379825 A1* 12/2014 Speier ..................... H04L 51/24
  709/206

(Continued)

OTHER PUBLICATIONS

Kwong et al., "Detection of Imperative and Declarative Question-Answer Pairs in Email Conversations", Proceedings of the Twenty-First International Joint Conference Artificial Intelligence, 2009, 6pgs.

Primary Examiner — Nam T Huynh
(74) Attorney, Agent, or Firm — Hickman Palermo Becker Bingham LLP

(57) ABSTRACT

A method of managing unanswered digital communications is disclosed. The method comprises identifying, by a processor, a list of digital communications associated with a user account of a user account as expecting a response or a follow-up; determining, by the processor, a group of unanswered digital communications from the list of digital communications; assigning priorities to the group of unanswered digital communications, the priorities indicating an order of responding to the group of unanswered digital communications; transmitting a notification regarding one or more of the group of unanswered digital communications to the user account, the notification including information related to the ranking.

19 Claims, 9 Drawing Sheets

(51) Int. Cl.
*G06F 16/435* (2019.01)
*G06F 16/2457* (2019.01)

(56) References Cited

U.S. PATENT DOCUMENTS

2016/0226811 A1* 8/2016 Kerschhofer ........... H04L 51/26
2018/0006989 A1* 1/2018 Dotan-Cohen ......... H04L 51/04

\* cited by examiner

US 10,432,776 B1

MANAGING UNANSWERED DIGITAL COMMUNICATIONS

FIELD OF THE DISCLOSURE

The present disclosure is in the technical field of digital communication processing. Another technical field is filtering and ranking of digital communications and guidance for further digital communications. Yet another technical field is operation of electronic mail servers, mail transfer agents and other electronic mail programs and computers.

BACKGROUND

Online communication is integral to the modern world. Example communication channels include electronic mail (email), calendaring, and chat. It is also commonplace today that the pace at which a person receives digital communications, such as email messages or calendar invitations, is faster than the pace at which the person can respond to these digital communications. Consequently, a response to a received digital communication may be delayed or simply missing, which could be damaging when it was important to respond to the received digital communication in time. It would be helpful to avoid such undesirable consequences.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

Figure 1:
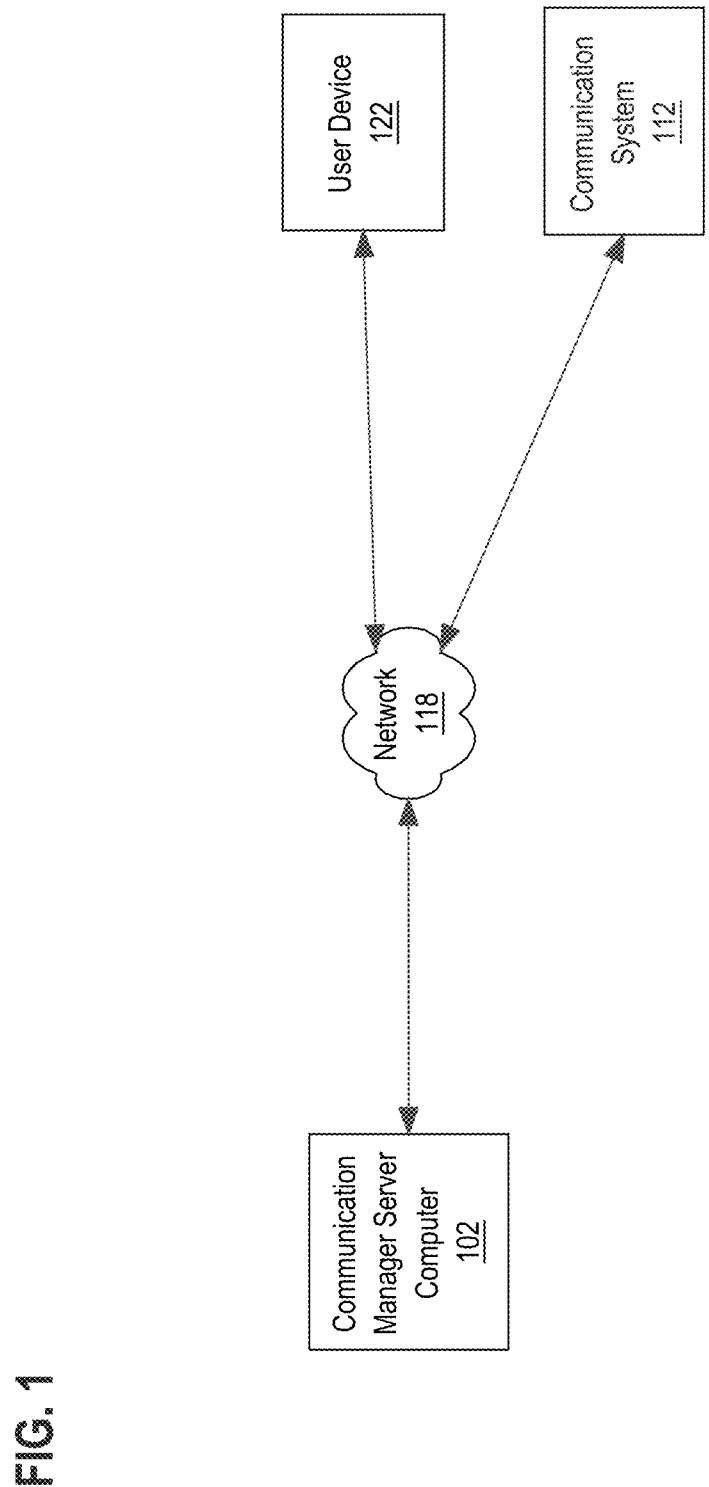
FIG. 1 illustrates an example networked computer system in which various embodiments may be practiced.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described in sections below according to the following outline:

1. GENERAL OVERVIEW
2. EXAMPLE COMPUTING ENVIRONMENT
3. EXAMPLE COMPUTER COMPONENTS
4. FUNCTIONAL DESCRIPTION
   4.1. DETECTING DIGITAL COMMUNICATIONS THAT EXPECT A RESPONSE OR A FOLLOW-UP
   4.2. DETERMINING UNANSWERED DIGITAL COMMUNICATIONS
   4.3. RANKING UNANSWERED DIGITAL COMMUNICATIONS
   4.4. PRESENTING RESULTS OF ANALYZING UNANSWERED DIGITAL COMMUNICATIONS
   4.5. PROCESSING FEEDBACK ON RESULTS OF ANALYZING UNANSWERED DIGITAL COMMUNICATIONS
5. EXAMPLE PROCESSES
6. HARDWARE IMPLEMENTATION
7. EXTENSIONS AND ALTERNATIVES

1. General Overview

A communication management server computer ("server") and related data processing methods, programmed to detect or identify and generate notifications about unanswered digital communications, are disclosed. In an embodiment, the server is programmed to identify digital communications that are associated with a user account for which a response or a follow-up by the user account has not occurred, and to prioritize these digital communications to reflect an order in which the user account should provide a response or a follow-up. For example, email messages that are unanswered, either by the sender or the receiver, may be detected automatically and identified in notifications. In an embodiment, the server is further programmed to send notifications or reminders of these digital communications to the user account so that the user account can timely provide the expected response or follow-up.

For example, a user account might be a communication account holding email messages and calendar events, such as invitations or replies. A first of the email messages sent to the user account by a client might solicit a response from the user account. A second of the email messages sent by the user account might solicit a response from a prospective customer. The server can be configured to determine whether any response to the first email message has been received and whether any follow-up by the user account has been sent. The response or the follow-up can be another one of the email messages or one of the calendar events. Up determining that the response and the follow-up have not been sent, the server can be configured to prioritize the two email messages, perhaps assigning a higher priority to the first email message because the relationship between the user account and the client is stronger than the relationship between the user account and the prospective customer or because the first email message was received before the second email messages was sent.

The server can then be configured to send a notification or reminder to the user account. The notification can indicate that the user account has two unanswered email messages, suggesting that a response to the first email message be provided before a follow-up to the second email message be provided. The notification can also include a reason for the suggestion. Using these approaches, the server may reduce the number of unanswered digital communications or the time to a response or a follow-up; furthermore, a technical result or improvement provided by these approaches is to reduce the number of network messages that are transmitted and the amount of network bandwidth that is consumed because fewer unnecessary messages need to be created, stored and transmitted by senders or receivers seeking responses to prior messages that were unanswered.

The server offers other technical benefits. By identifying unanswered digital communications that potentially require a response or a follow-up and ranking them to suggest an order of addressing these unanswered digital communications, the server enables a user account to focus on important digital communications and to move digital conversations forward. Therefore, the server promotes improvement in the efficiency and the quality of digital communications. The server further increases the communication efficiency of the user account and computing devices through which user accounts are accessed.

2. Example Computing Environment

FIG. 1 illustrates an example networked computer system with which various embodiments may be practiced. FIG. 1 is shown in simplified, schematic format for purposes of illustrating a clear example and other embodiments may include more, fewer, or different elements.

In some embodiments, the networked computer system comprises a communication management server computer 102, one or more user devices 122, and one or more communication systems 112, which are communicatively coupled directly or indirectly via one or more networks 118.

In some embodiments, the server 102 broadly represents one or more computers, virtual computing instances, and/or instances of a server-based application that is programmed or configured with data structures and/or database records that are arranged to host or execute functions including but not limited to analyzing digital communications of a user account and providing recommendations to the user account on managing the digital communications. The server 102 can comprise a server farm, a cloud computing platform, a parallel computer, or any other computing facility with sufficient computing power in data processing, data storage, and network communication for the above-described functions.

In some embodiments, a user device 122 is programmed to provide the server 102 with access to communication accounts holding digital communications, such as an email account that is associated with digitally stored email messages. A user account may be maintained in the communication system 112, for example, and the user device 122 may access the user account after submitting access credentials or authorization data. The user device 122 is also programmed to receive from the server 102 results of analyzing the digital communications, such as notifications of an unanswered status of the digital communications. The user device 122 may comprise a desktop computer, laptop computer, tablet computer, smartphone, wearable device, or any other type of computing device with sufficient computing power in data processing, data storage, and network communication. In some embodiments, the user device 122 hosts or executes a browser program and communicates with one or both of the server 102 and the communication system 122 via protocols such as HTTP for exchange of electronic documents formatted according to HTML. In other embodiments, the user device 122 may host or execute a local application or app that is programmed to use HTTP via the network 118 to exchange app-specific messages with compatible interfaces at the server 102.

In some embodiments, a communication system 112 is programmed to manage one or more communication accounts. The communication system 112 may comprise a mail server, mail transfer agent, or mail user agent. In certain embodiments, the communication system 112 may be integrated with the user device 122.

The network 118 may be implemented by any medium or mechanism that provides for the exchange of data between the various elements of FIG. 1. Examples of the network 118 include, without limitation, one or more of a cellular network, communicatively coupled with a data connection to the computing devices over a cellular antenna, a near-field communication (NFC) network, a Local Area Network (LAN), a Wide Area Network (WAN), the Internet, a terrestrial or satellite link, etc.

In some embodiments, the user device 122 is programmed to send a request to the server 102 for managing unanswered digital communications. The request may include data for accessing a communication account of the user account managed by the communication system 112. In response to the request, the server 102 is programmed to receive digital communications in the communication account from the communication system 112. The server 102 is programmed to further identify those digital communications that still require the user's response or follow-up and prioritize them for the user. The server 102 is programmed to then send the prioritization result or related recommendations to the user account. As the user account continues his or her online communication, the server 102 can be configured to continuously analyze the digital communications received from the communication system 112 and send the analysis result to the user device 122.

3. Example Computer Components

Figure 2:
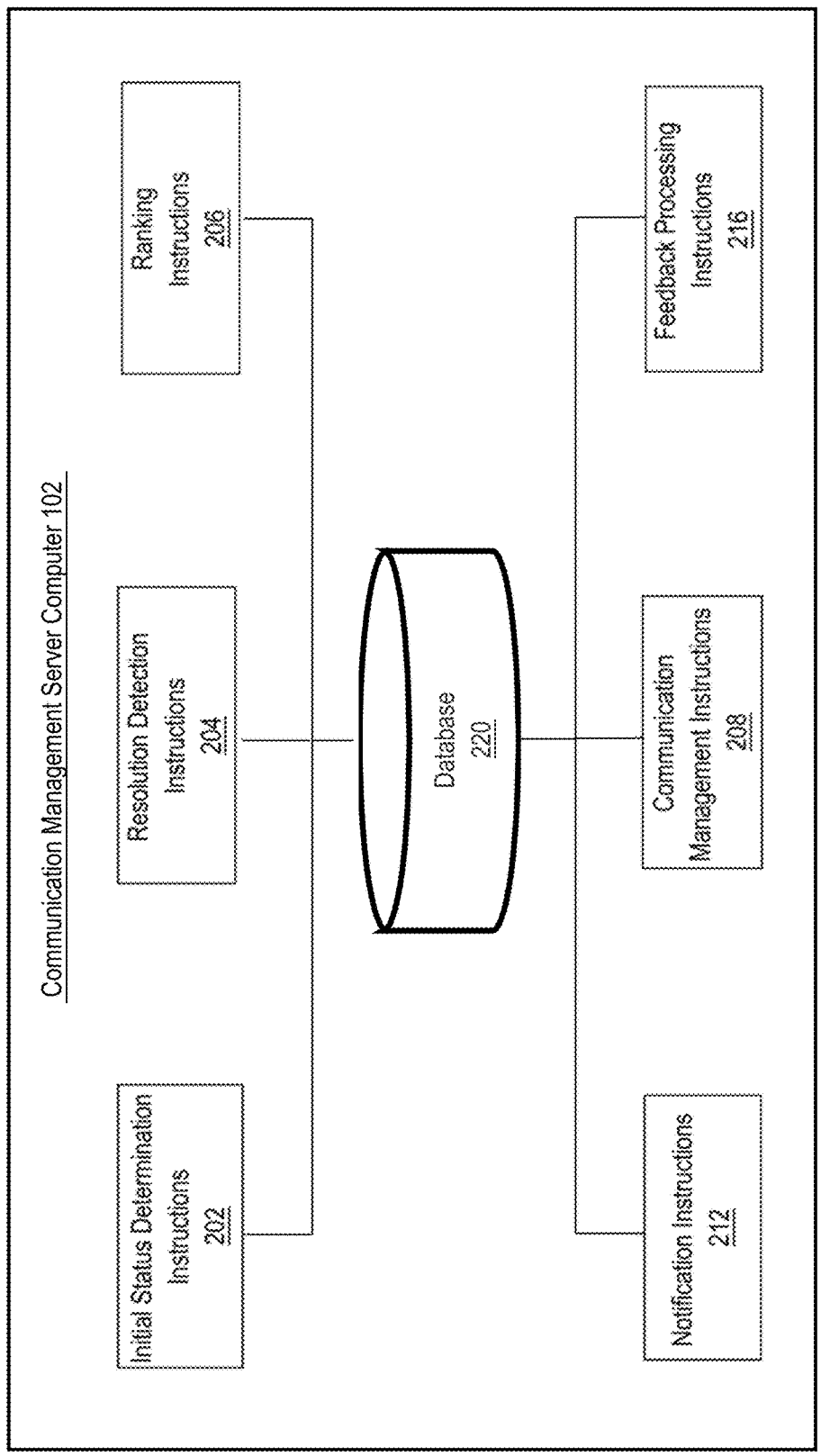
FIG. 2 illustrates example components of a communication management server computer in accordance with the disclosed embodiments.

FIG. 2 illustrates example components of the communication management server computer in accordance with the disclosed embodiments. FIG. 2 is provided to illustrate one clear example, and the server 102 can comprise fewer or more functional or storage components. Each of the functional components can be implemented as software components, general or specific-purpose hardware components, firmware components, or any combination thereof. A storage component can be implemented using any of relational databases, object databases, flat file systems, or JSON stores. A storage component can be connected to the functional components locally or through the networks using programmatic calls, remote procedure call (RPC) facilities or a messaging bus. A component may or may not be self-contained. Depending upon implementation-specific or other considerations, the components may be centralized or distributed functionally or physically.

In some embodiments, the server 102 can comprise a communication management component 208, an initial status determination component 202, a resolution detection component 204, a ranking component 206, a notification component 212, and a feedback processing component 216. In addition, the server 102 can comprise a database module 220.

In some embodiments, the communication management component 208 is programmed or configured to communicate with the communication system 112 to access a communication account and retrieve digital communications in the communication account. The communication management component 208 is also configured to feed the digital communications to the initial status determination component 202 and the resolution detection component 204 for analysis.

In some embodiments, the initial status determination component 202 is programmed or configured to review each of the retrieved digital communications to determine the initial status of the digital communication. Based on the content of the digital communication, the initial status determination component 202 can be configured to determine whether the digital communication expects a response or a follow-up.

In some embodiments, the resolution detection component 204 is programmed or configured to review the retrieved digital communications and further determine whether a response or a follow-up has been made for any of the digital communications that have been determined to expect a response or a follow-up. When a response or a follow-up has been made, the corresponding digital communication is considered resolved; otherwise, the digital communication is considered unanswered. The resolution detection component 204 can be programmed to further consider user account feedback to previous results of resolution detection in determining whether a digital communication that expects a response or a follow-up should be considered resolved or unanswered.

In some embodiments, the ranking component 206 is programmed or configured to rank or prioritize the unanswered digital communications such that a higher priority is given to an unanswered digital communication that needs to be addressed sooner. The ranking component 206 can be configured to take various factors into consideration, such as the content or the sender or the recipient of a digital communication or user account feedback related to individual digital communications.

In some embodiments, the notification component 212 is programmed or configured to transmit data related to the unanswered digital communications to the user device 122, such as the total number or the prioritization of the unanswered digital communications. The data can be in the form of a status notification, a reminder to provide a response or a follow-up, or a recommendation on how to tackle the unanswered digital communications.

In some embodiments, the feedback processing component 216 is programmed or configured to receive user account feedback from the user device 122 in response to the data related to the unanswered digital communications. The feedback can include an identification of false negatives or positives of unanswered digital communications or an updated ranking of the unanswered digital communications, for example. The feedback processing component 216 is programmed to send the user account feedback to the resolution detection component 204 or the ranking module 206, as noted above.

In some embodiments, the database 220 is programmed or configured to manage relevant data structures and store relevant data for functions performed by the server 102. The data may correspond to information regarding users and user accounts, credentials for communication accounts, digital communications, metadata related to digital communications, or user account feedback.

4. Functional Description 4.1 Detecting Digital Communications that Expect a Response or a Follow-Up In some embodiments, the server 102 is programmed to access a communication account holding digital communications, such as email messages, calendar events, or chat messages. The server 102 is programmed to then filter out certain digital communications for further consideration. Each digital communication can be parsed to extract certain basic information according to a standard format specification, such as the Internet Message Format, or by other custom approaches. The server 102 can also be programmed to obtain additional information regarding the digital communications from the communication system 112. For example, the communication system 112 might offer software or services for managing digital communications, such as the Gmail™ webmail service, which maintain different types of information regarding the digital communications.

In some embodiments, the age of a digital communication based on the transmission date can be identified, and the digital communication is to be filtered out when the age falls outside a certain range, such as one to fourteen days old, although any time range or age value may be used in other embodiments. The sender and recipients of a digital communication can also be identified, where the digital communication is considered inbound when the user account is one of the recipients and outbound when the user account is the sender. The organizations to which the sender and the recipients belong can be further identified based on the content of the digital communication, including identifying information of the sender and recipients, or additional user account input. Those digital communications between people who belong to the same organization can also be filtered out.

In addition, those digital communications sent by people with whom the user account has never communicated, which are considered as cold inbound digital communications, can be filtered out. Those digital communications sent by the user account to introduce the user to the recipients or to introduce the recipients to each other are considered as introductory digital communications. Such introductory digital communications might contain "introduce" or similar keywords. When an introductory digital communication was sent to introduce the recipients to each other, replies by those recipients can also be filtered out. Moreover, those digital communications that were sent to a mailing list or have a number of recipients that exceeds a threshold can be filtered out.

The server 102 can also be configured to determine whether a digital communication was sent or received by a bot, such as an out-of-office reply or a shopping receipt. For example, "Out of office" or similar keywords can be used for identification purposes. The server 102 can be configured to further determine whether a digital communication contains malicious content according to a given database of malicious hosts or code or relying on spam detection data provided by other software or services for managing digital communications. Such a digital communication can also be filtered out.

In some embodiments, the server 102 is programmed to further process those digital communications that have not yet been filtered out to identify each digital communication that expects a response or a follow-up, or more specifically an inbound digital communication that expects a response from the user account or an outbound digital communication that expects a response from one of the recipients and thus a follow-up from the user account. The server 102 can be programmed to further segment the body of a digital communication into sentences and break up each sentence into phrases. Each word in these phrases can then be assigned a part-of-speech ("POS") tag using natural language processing techniques known to someone skilled in the art. When the digital communication corresponds to a thread of back-and-forth communications, as further discussed below, the latest content can be extracted for such segmentation.

The server 102 can be programmed to then identify certain phrases that may indicate an expectation for a response or a follow-up based on the POS tags. Those digital communications that include the certain phrases can then be determined as expecting a response or a follow-up. Sentences that end with a question mark or start with when/what/where/how and follow the sentence structure typical of a question are generally considered to indicate an expectation for a response or a follow-up. The certain phrases can also include "let me know" followed by content that is not open-ended. For instance, "let me know if you have any questions" sounds open-ended without referring to any specific item or task, while "let me know when works for you" includes a request for a specific time without sounding generic.

Other examples of implicit questions include "I was wondering . . . " or "just wanted to follow up". Such phrases can often be found in introductory digital communications sent to introduce the user account to the recipients. In addition, the certain phrases can include imperative commands, such as "shoot him an email", "send me that document", or others having a similar grammatical structure to indicate an expectation for a response. Furthermore, the digital communications in which the user account is one of the recipients being introduced to the other recipients can be determined as expecting a response.

4.2 Determining Unanswered Digital Communications

In some embodiments, the server 102 is programmed to review the digital communications in the communication account to determine whether any of those digital communications that expect a response or a follow-up have already been resolved. The server 102 can be programmed to rely on the "replied" (responded to or forwarded) status or other communication metadata of a digital communication, which may be provided by other software or services for managing digital communications or perform internal tracking. The tracking can be limited to digital communications that were created within a certain period from the creation date of the initial digital communication, such as two weeks. The tracking might include looking for a subsequent digital communication that has the same subject or title as the initial digital communication except being prefixed by a certain status indicator, such as "Re" or "Fw". The tracking might also include further analyzing the content of the digital communication. For example, a reply sent by one of the recipients to a digital communication sent by the user account might have a title that is prefixed by "Re", while a follow-up sent by the user account subsequent to a digital communication sent by the user account might have a title that is prefixed by "Re" or "Fw".

In some embodiments, an introductory digital communication that expects a follow-up by the user account can be resolved with a response to the introduction by a recipient or a follow-up by the user account (the sender). More generally, the server 102 is programmed to resolve an outbound digital communication that expects a follow-up by a digital communication that was sent later in the same conversation thread by either one of the original recipients (i.e. a response by a recipient) or by the user account (i.e. a follow-up by the user account). The server 102 is programmed to also resolve an inbound digital communication that expects a response by the user account by a digital communication that was sent later in the same conversation thread by the user account (i.e., a response by the user account) or by the original sender or any one of the original non-user recipients (i.e. a follow-up by another recipient on that communication thread).

Furthermore, the server 102 can be programmed to find a resolution of one type of digital communication by another type of digital communication. For example, an email message might refer to a follow-up meeting, and a subsequent calendar event created corresponding to that meeting can be determined as the "reply" to that email message (i.e., the calendar event resolves that email message). The server 102 can be configured to match up the email message with the calendar event by looking at the overlap between the attendees on the event and the senders and recipients of the email message or the time gap between when the email message was sent and when the event was created. Additionally, the server can consider factors such as overlap in keywords or other attributes. The server 102 is programmed to then determine those digital communications that expect a response or a follow-up but have not been resolved as unanswered digital communications.

In some embodiments, the server 102 is configured to change a certain status as a result of the a digital communication being resolved, such as marking the digital communication as "read" followed by reflecting the "read status in a corresponding notification to the user account. In certain embodiments, the server 102 is programmed to perform the resolution process discussed in this section as part of the detection process discussed in the previous section so that digital communications that are already resolved are preemptively not considered as expecting a response or follow-up. In certain embodiments, the server 102 is programmed to also perform the resolution process discussed in this section after the detection process discussed in the previous section so that any digital communication that was not resolved at the time of the detection process can still be resolved when a resolving digital communication occurs at a later point in time.

4.3 Ranking Unanswered Digital Communications

In some embodiments, the server 102 is programmed to rank the unanswered digital communications to assist the user account in responding to the unanswered digital communications. Typically, a higher rank or priority is assigned to a digital communication when the digital communication needs a response or a follow-up sooner. The server 102 can be programmed to give a higher priority to an inbound digital communication than an outbound digital communication, or to a calendar event than an email message. The ranking determination can also depend on the strength of the relationship between the user account and the rest of the participants on the communication thread. For example, a larger frequency of communication or more recent communication or belonging to the same organization might indicate a closer relationship. The server 102 can also be configured to obtain similar priority information form other software or services for managing digital communications, or look for status indicators, such as "Urgent" or "Important", within the digital communications. The server 102 thus can be programmed to compute a weighted score of the different factors for each unanswered digital communication as the rank or priority.

4.4 Presenting Results of Analyzing Unanswered Digital Communications

In some embodiments, the server 102 is programmed to send results of analyzing the digital communication in the user's communication account to the user device 122. The results can include notifications or reminders of those unanswered digital communications, ranking or prioritization of those unanswered digital communications, or other recommendations on how to handle the unanswered digital communications. These results can be presented as digital communications from an administrator of the server 102 to the user account or in other forms. The results can be transmitted to the user device 122 upon request, as soon as unanswered digital communications are identified, or according to a specific schedule. The results can be separately transmitted for individual unanswered digital communications or for a group of unanswered digital communications in an aggregate fashion. For example, a reminder can be sent for each unanswered digital communication or for all the unanswered digital communications on a weekly basis.

Figure 3:
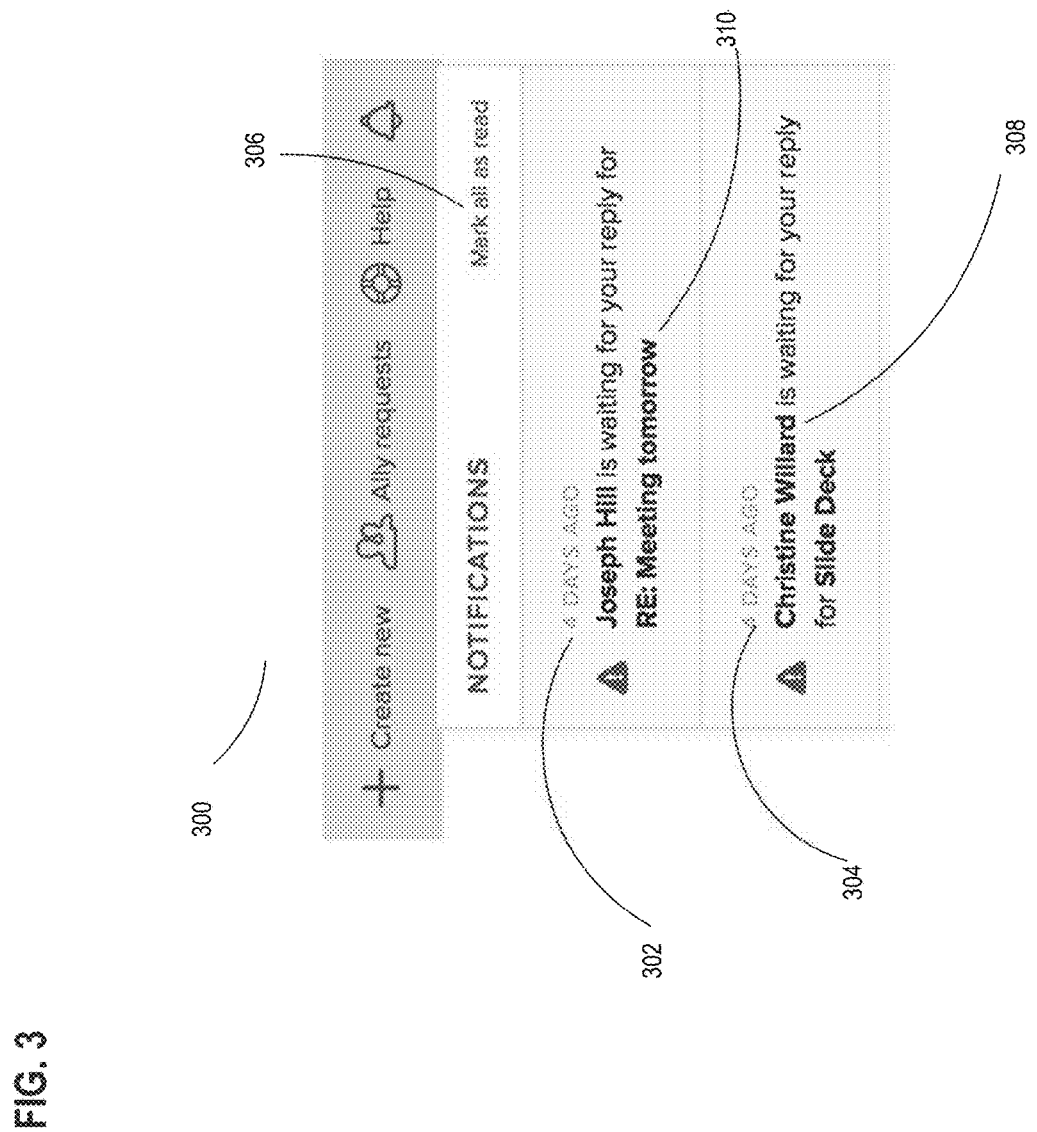
FIG. 3 illustrates an example screen display of a graphical user account interface that may be generated using the computer systems of FIG. 1 and FIG. 2, and displaying one or more notifications of unanswered digital communications.

FIG. 3 illustrates an example screen display of a graphical user account interface that may be generated using the computer systems of FIG. 1 and FIG. 2, and displaying one or more notifications of unanswered digital communications. In an embodiment, the screen display 300 of FIG. 3 forms a part of a larger graphical user interface or dynamic HTML page that is generated by the server 102 in response to a request from the user device 122. In an embodiment, the screen display 300 comprises a notification panel 301 having zero or more notifications 302, 304 and a header bar with one or more hyperlinked options 306. In an embodiment, a certain number of the latest reminders or notifications 302, 304 are displayed in the notification panel 301. Each of the notifications 302, 304 can indicate the time sent, such as 4 days ago, or summary information regarding the unanswered digital communication, such as the identifier 308 of the sender or a recipient or the title 310 of the unanswered digital communication.

In some embodiments, a user identifier, such as Joseph Hill or Christine Willard as in the example of FIG. 3, may be associated with a record managed by the server 102 of user accounts that are participating in the system that is described herein. In such an embodiment, each user identifier may be programmed as a hyperlink which when selected causes the server 102 to return information about a user account associated with the linked user identifier. Furthermore, the title of the unanswered digital communication also may comprise a hyperlink which when selected causes the server 102 to return a page or screen that displays details for the corresponding message in a manner that emulates an email client program inbox.

The reminders can be displayed in many other shapes or forms, and the content of each notification can also include different pieces of an unanswered digital communications or metadata associated with the unanswered digital communication. The screen can also offer a single option 306 or one option for each reminder to update a certain status of the corresponding unanswered digital communications, such as marking it read.

Figure 4:
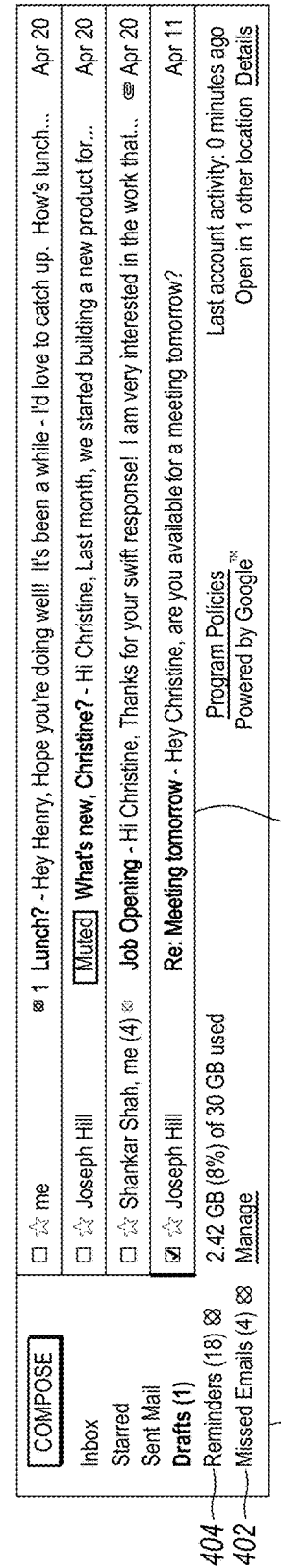
FIG. 4 illustrates an example screen displaying a list of digital communications in a communication account with indicators for reminders of unanswered digital communications.

FIG. 4 illustrates an example screen displaying a list of digital communications in a communication account with indicators for reminders of unanswered digital communications.

In an embodiment, server 102 generates the example screen display 400 of FIG. 4 as a dynamic HTML page that is delivered to the user device 122 in response to a request. In an embodiment, the screen 400 may resemble an email inbox or other user account interface but also is programmed to facilitate the viewing and tracking of unanswered digital communications and related data.

In an embodiment, a left panel 401 comprises a hierarchical list of message folder labels, which can include a first folder 402 of unanswered digital communications and a second folder 404 of reminders. In an embodiment, reminders of unanswered digital communications are presented as digital communications also, and a label identifying the second folder 404 may include, in parentheses, a total count of the reminders. Similarly, the first folder 402 of unanswered digital communications may be displayed with a total count of unanswered digital communications. Digital communications that are logically within the first folder 402 and/or second folder 404 may be displayed in a center panel 405 of the screen 400, or hidden.

In an embodiment, the folders 402, 404 enable easily accessing the reminders or unanswered digital communications. For example, input indicating a selection of the folder 402 of unanswered digital communications can trigger the server 102 to present a listing of all the unanswered digital communications in accordance with their associated priorities.

In an embodiment, the center panel 405 is a tabular display comprising rows representing digital communications in one of the folders and columns representing attributes of digital communications, such as sender, age, title, date, or other attributes. In this example, the rows represent the four unanswered digital communications in the first folder.

Figure 5:
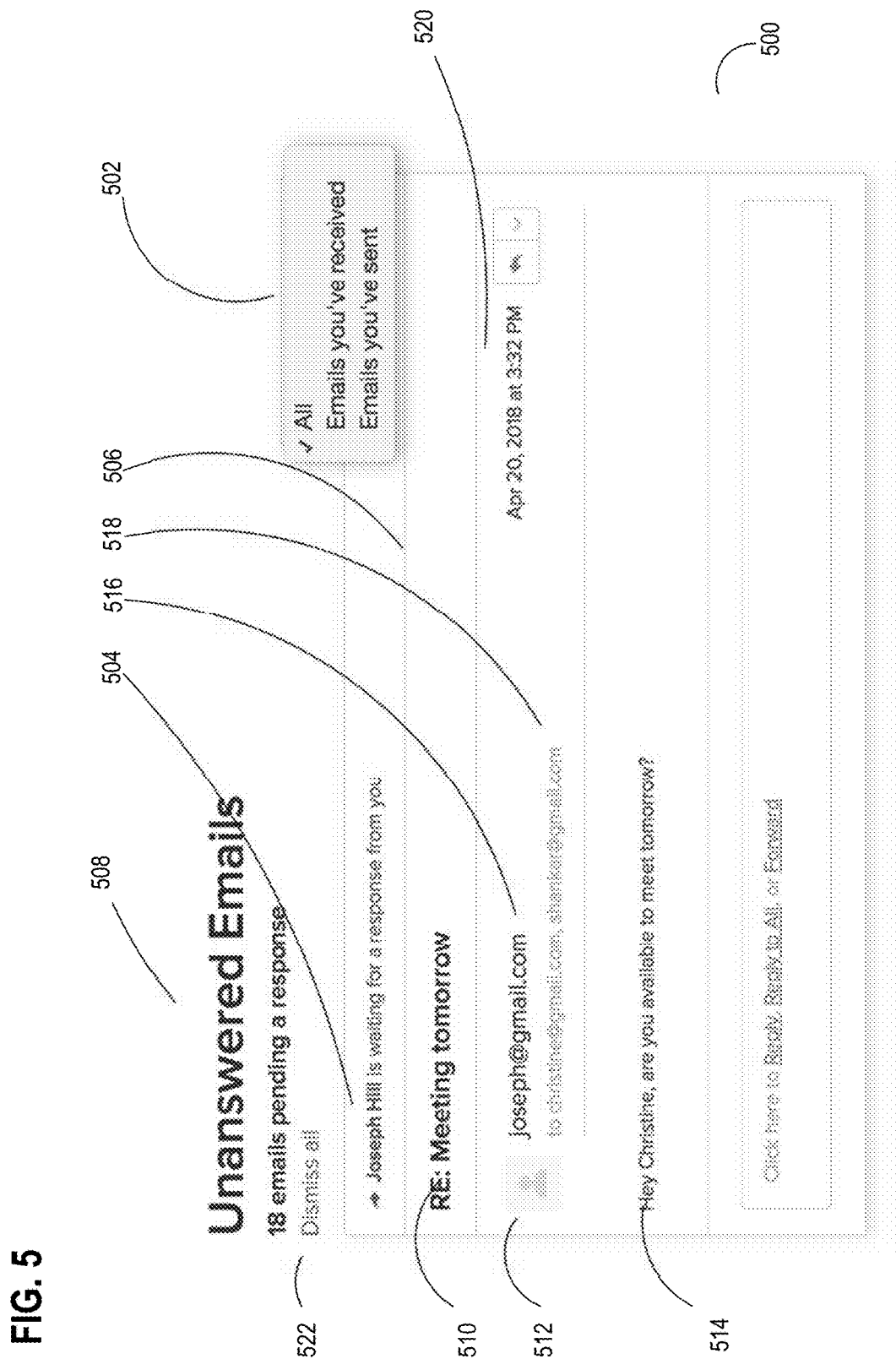
FIG. 5 illustrates an example screen displaying an unanswered digital communication along with a corresponding indicator.

FIG. 5 illustrates an example screen displaying an unanswered digital communication along with a corresponding indicator.

In an embodiment, the screen display 500 of FIG. 5 forms a part of a larger graphical user interface or dynamic HTML page that is generated by the server 102 in response to a request from the user device 122. In an embodiment, the screen display 500 comprises a summary section 508, a filter 502, a status banner 504, and a message section 506. The summary section 508 indicates the total number of unanswered digital communications and also includes an option 522 to dismiss all these unanswered digital communications, marking them as resolved or requiring no further actions.

In an embodiment, the message section 506 shows the unanswered digital communication as usual, including a title 510, a header 512 having information regarding the sender 516, the recipients 518, and the receipt date 520, and a body 514. The status banner 504 indicates that this digital communication is an unanswered digital communication. In this example, the digital communication is an inbound email message that expects a response from one of the recipients and thus a response by the user account, and the status banner 504 specifically states that the sender is waiting for a response from the user account.

In some embodiments, the filter 502 is in the form of a toggle that allows filtering of the unanswered digital communications. In this example, the choices are all unanswered email, inbound unanswered email, and outbound unanswered email. As this digital communication is an inbound email message, it will no longer be shown in response to a selection of the option "Emails you've sent". Other choices can be displayed, such as by sender, recipient, receipt date, or relationship strength between the sender and the recipients. Alternatively, a single toggle can be shown at a higher level rather than on the screen for each unanswered digital communication.

Figure 6:
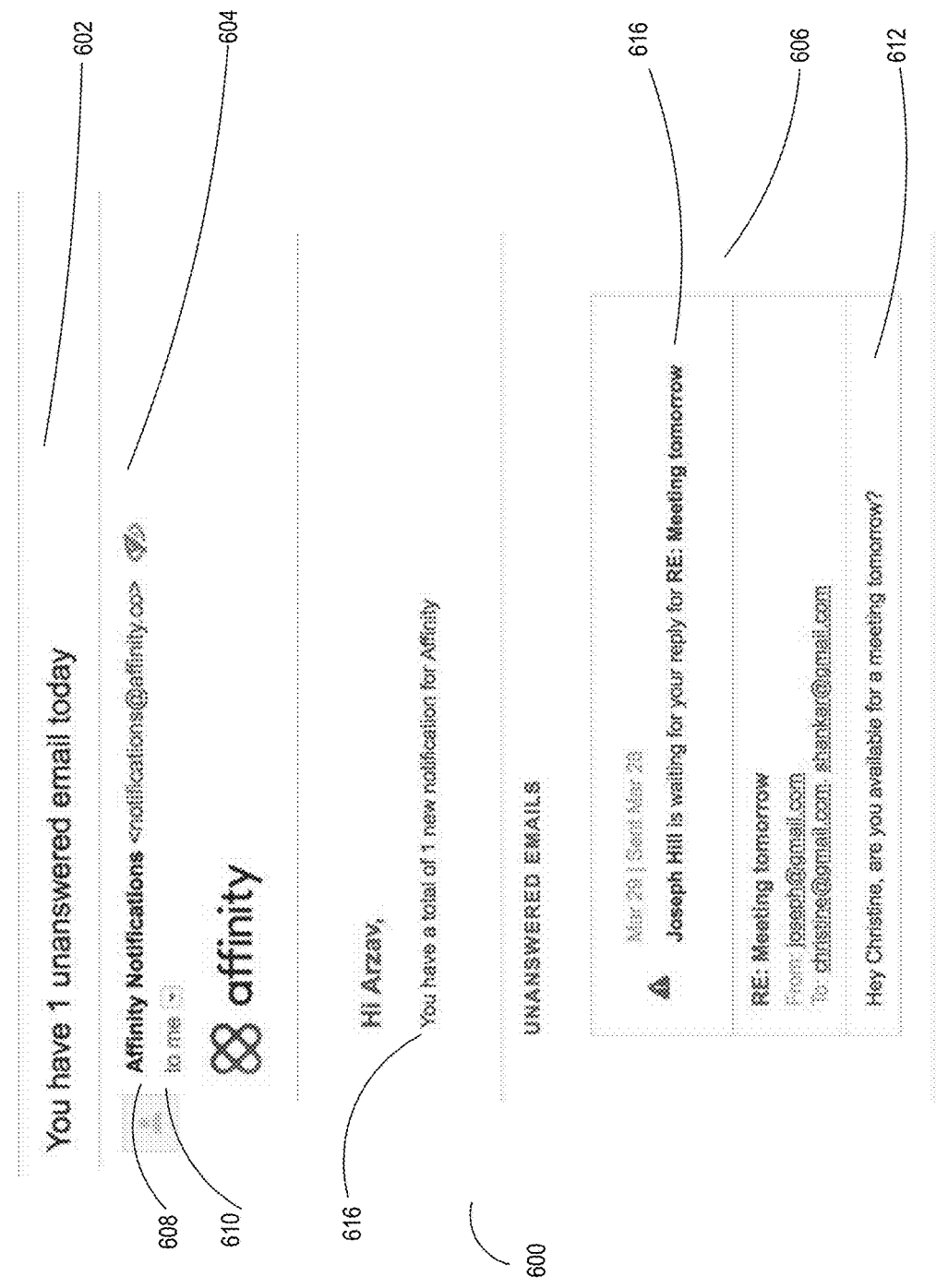
FIG. 6 illustrates an example screen displaying a reminder or notification of an unanswered digital communication in the form of a digital communication.

FIG. 6 illustrates an example screen displaying a reminder or notification of an unanswered digital communication in the form of a digital communication.

In an embodiment, the screen display 600 of FIG. 6 forms a part of a larger graphical user interface or dynamic HTML page that is generated by the server 102 in response to a request from the user device 122. In one embodiment, the screen display 600 comprises typical fields of a digital communication, including a title 602, a header 604, and a body 606.

In some embodiments, the title 602 of the reminder digital communication indicates a summary of all the unanswered digital communications. The header 604 indicates the sender 608 of the reminder, such an administrator account of the server 102, and the recipient 610 of the reminder, who would be the user account.

In one embodiment, the body 606 of the reminder includes a summary 616 of all the reminders or notifications since the last reminder. The body 606 also includes a concatenation of all the unanswered digital communications since the last reminder. Specifically, the body 606 includes a message section, such as 612 similar to 506 in FIG. 5, that is prefixed with a status banner, such as 616 similar to 504 in FIG. 5. In this example, there is only one unanswered digital communication since the last reminder. In general, the message sections can be arranged in the body 606 in accordance of the ranking of the corresponding unanswered digital communications. In one embodiment, the status banner or title of one of the unanswered digital communications can be programmed as a hyperlink which when selected causes the server 102 to display the unanswered digital communication in a separate screen with options to process or resolve the unanswered digital communication.

4.5 Processing Feedback on Results of Analyzing Unanswered Digital Communications In some embodiments, the server 102 is programmed to receive user account feedback on the results of identifying and analyzing unanswered digital communications from the user device 122. The user account feedback can indicate that a digital communication should have been identified as an unanswered digital communication or an unanswered digital communication should not have been identified as one. The user account feedback can also indicate that an unanswered digital communication can be ignored and determined as resolved. The server 102 can be configured to then analyze the user account feedback and incorporate the analysis result into processing future digital communications of the user. The server 102 can determine one or more features from the digital communications indicated by the user account as unanswered or to be ignored and similarly classify future digital communications having those features. For example, when the user account feedback indicates that an email message from a particular organization is to be ignored, the server 102 can be configured to request a confirmation that the organization is a bot and automatically eliminate future email messages sent by this organization from further processing related to unanswered digital communications. For further example, when the user account feedback indicates that an email message is to be identified as an unanswered digital communication, the server 102 can be configured to request specification of a phase within the email message as an indicator of expecting a response or a follow-up and automatically consider future email messages that include the specified phrase in the processing related to unanswered digital communications.

Figure 7:
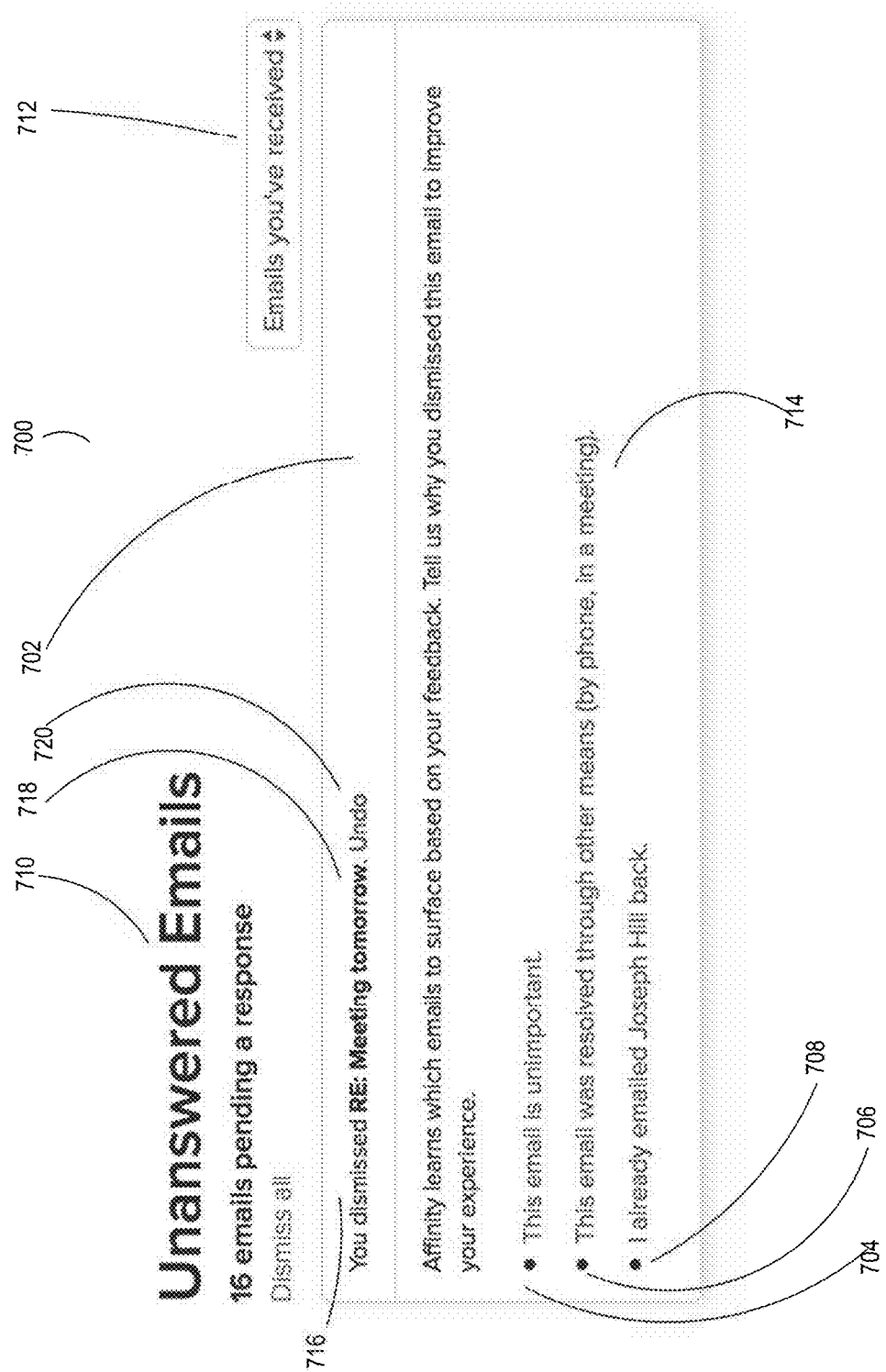
FIG. 7 illustrates an example screen displaying a dialog requesting specification of a reason for marking an unanswered digital communication as resolved.

FIG. 7 illustrates an example screen displaying a dialog requesting specification of a reason for marking an unanswered digital communication as resolved.

In an embodiment, the screen display 700 of FIG. 7 forms a part of a larger graphical user interface or dynamic HTML page that is generated by the server 102 in response to a request from the user device 122. In one embodiment, the screen display 700 comprises a summary section 710, a filter 712, a status section 702, and a body 714. The summary section 710 is similar to 522 in FIG. 5, and the filter 712 is similar to 502 in FIG. 5.

In some embodiments, the status section 702 shows a description 716 of the user's action, an identification 718 of the unanswered digital communication being acted on, and an option 720 to undo the action.

In one embodiment, the body 714 shows a few common reasons for marking an unanswered digital communication as resolved or to be dismissed from further consideration. For example, the first listed reason 704 indicates that the unanswered digital communication can be ignored, and the second listed reason 706 indicates that the unanswered digital communication might have been resolved by a non-digital communication, such as an in-person meeting. The third listed reason 708 indicates that the unanswered digital communication should not have been considered unanswered. The selection of any of these reasons can be used in determining whether future digital communications of the user account are unanswered digital communications.

5. Example Processes

Figure 8:
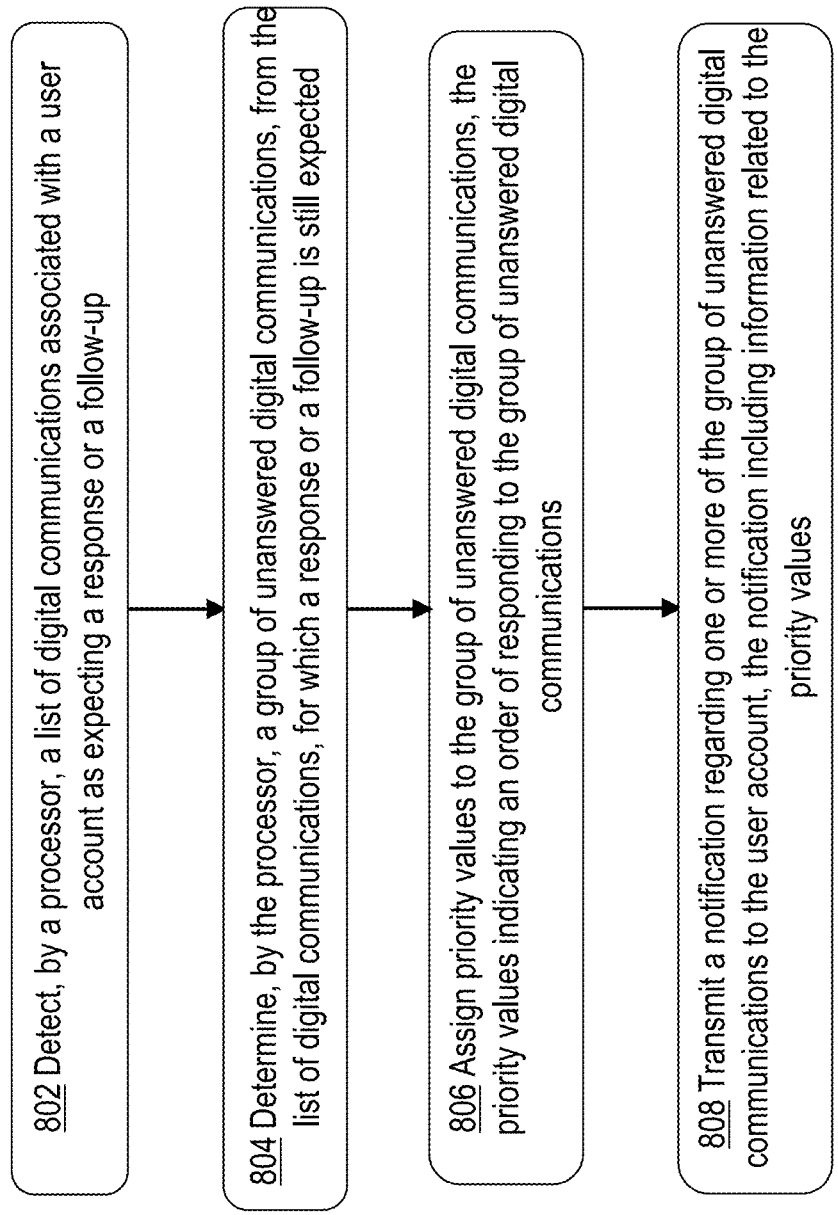
FIG. 8 illustrates an example process performed by the server of managing unanswered digital communications.

FIG. 8 illustrates an example process performed by the server of managing unanswered digital communications. FIG. 8 is shown in simplified, schematic format for purposes of illustrating a clear example and other embodiments may include more, fewer, or different elements connected in various manners. FIG. 8 is intended to disclose an algorithm, plan or outline that can be used to implement one or more computer programs or other software elements which when executed cause performing the functional improvements and technical advances that are described herein. Furthermore, the flow diagrams herein are described at the same level of detail that persons of ordinary skill in the art ordinarily use to communicate with one another about algorithms, plans, or specifications forming a basis of software programs that they plan to code or implement using their accumulated skill and knowledge.

In step 802, the server 102 is programmed or configured to identify a list of digital communications associated with a user account as expecting a response or a follow-up. The server 102 can be configured to retrieve digital communications from one or more communication accounts of the user account. The server 102 can be configured to eliminate from further consideration those digital communications that are inbound cold introductory digital communications or that are potentially sent by a bot or sent to a large list of recipients. The server 102 can be further configured to identify those digital communications that contain direct or implicit questions as expecting a response or a follow-up.

In step 804, the server 102 is programmed or configured to determine a group of unanswered digital communications, from the list of digital communications, for which a response or a follow-up is still expected. The server 102 can be configured to examine other digital communications in the one or more communication accounts of the user account and determine whether any of them is responsive to a digital communication that has been identified as expecting a response or a follow-up. The responsive relationship can be derived when the digital communications belong to the same thread or have substantially the same title, subject matter, or sender and recipients. The server 102 can be programmed to further determine those digital communications that expect a response or a follow-up but have not been resolved because no response or follow-up is available yet as unanswered digital communications.

In step 806, the server 102 is programmed or configured to assign priority values to the group of unanswered digital communications, the priority values indicating an order of responding to the group of unanswered digital communications. The server 102 can be configured to prioritize the unanswered digital communications by preferring inbound digital communications to outbound digital communications and otherwise sorting the digital communications based on a strength of the relationship between the user account and others among the sender and the recipients.

In step 808, the server 102 is programmed or configured to transmit a notification regarding one or more of the group of unanswered digital communications to the user account, the notification including information related to the priority values. The notification can be a reminder, to be presented as a pop-up or another digital communication directed to one of the user's communication accounts. The notification can be at a summary level including or reflecting priority information or other statistics of all the unanswered digital communications within a certain period of time. For example, the notification can include a concatenation of all the answered digital communications in the order of their priority values. The notification can include indicators associated with individual unanswered digital communications. The server 102 can be configured to transmit notifications upon request, as soon as the unanswered digital communications are identified, or according to a specific schedule, such as on a daily basis.

The server 102 can be programmed or configured to further collect user account replies to the notifications from the user device 122. The user account replies can indicate that an unanswered digital communication can be ignored, has been resolved, or should not have been identified as an unanswered digital communication. The user account replies can also indicate that a digital communication should have been identified as expecting a response or a follow-up and thus as an unanswered digital communication. The server 102 can be configured to further identify features from the specific digital communications referred to in the user account replies and process future digital communications having those features in a similar manner.

6. Implementation Example—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 9:
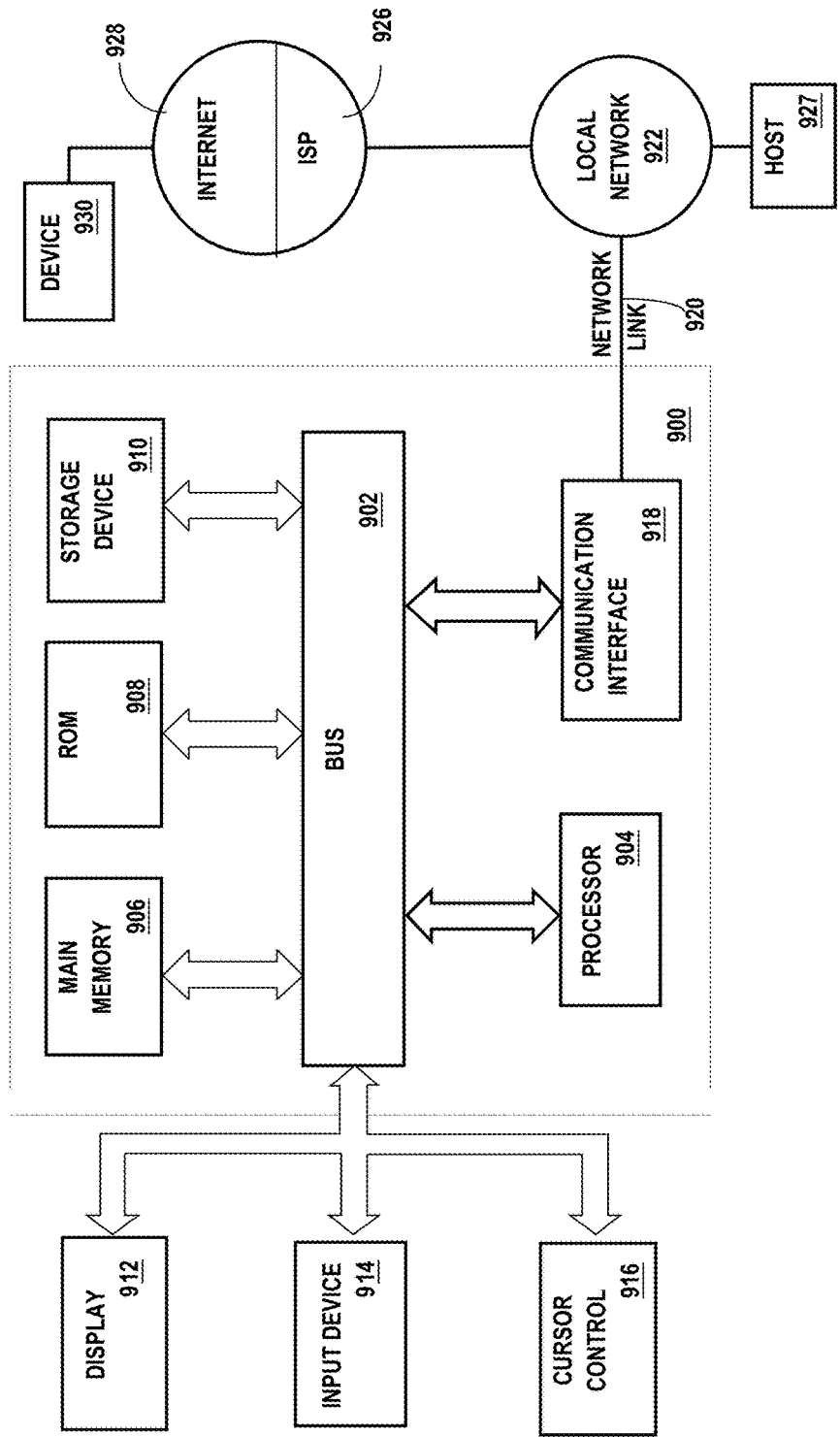
FIG. 9 is a block diagram that illustrates a computer system upon which an embodiment of the invention may be implemented.

For example, FIG. 9 is a block diagram that illustrates a computer system 900 upon which an embodiment of the invention may be implemented. Computer system 900 includes a bus 902 or other communication mechanism for communicating information, and a hardware processor 904 coupled with bus 902 for processing information. Hardware processor 904 may be, for example, a general purpose microprocessor.

Computer system 900 also includes a main memory 906, such as a random access memory (RAM) or other dynamic storage device, coupled to bus 902 for storing information and instructions to be executed by processor 904. Main memory 906 also may be used for storing temporary variables or other intermediate information during execution of instructions to be executed by processor 904. Such instructions, when stored in non-transitory storage media accessible to processor 904, render computer system 900 into a special-purpose machine that is customized to perform the operations specified in the instructions.

Computer system 900 further includes a read only memory (ROM) 908 or other static storage device coupled to bus 902 for storing static information and instructions for processor 904. A storage device 910, such as a magnetic disk, optical disk, or solid-state drive is provided and coupled to bus 902 for storing information and instructions.

Computer system 900 may be coupled via bus 902 to a display 912, such as a cathode ray tube (CRT), for displaying information to a computer user. An input device 914, including alphanumeric and other keys, is coupled to bus 902 for communicating information and command selections to processor 904. Another type of user account input device is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane.

Computer system 900 may implement the techniques described herein using customized hard-wired logic, one or more ASICs or FPGAs, firmware and/or program logic which in combination with the computer system causes or programs computer system ~00 to be a special-purpose machine. According to one embodiment, the techniques herein are performed by computer system 900 in response to processor 904 executing one or more sequences of one or more instructions contained in main memory 906. Such instructions may be read into main memory 906 from another storage medium, such as storage device 910. Execution of the sequences of instructions contained in main memory 906 causes processor 904 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 910. Volatile media includes dynamic memory, such as main memory 906. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 902. Transmission media can also take the form of acoustic or light waves, such as those generated during radio-wave and infra-red data communications.

Various forms of media may be involved in carrying one or more sequences of one or more instructions to processor 904 for execution. For example, the instructions may initially be carried on a magnetic disk or solid-state drive of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card, cable modem, satellite modem, or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world wide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are example forms of transmission media.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918.

The received code may be executed by processor 904 as it is received, and/or stored in storage device 910, or other non-volatile storage for later execution.

7. Extensions and Alternatives

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method of managing unanswered digital communications, comprising:
    identifying, by a processor, a list of digital communications associated with a user account as expecting a response or a follow-up;
    determining, by the processor, a group of unanswered digital communications, from the list of digital communications, for which a response or a follow-up is still expected;
    assigning priority values to the group of unanswered digital communications,
        the priority values indicating an order of responding to the group of unanswered digital communications,
        the assigning comprising prioritizing an unanswered digital communications sent to the user account over an unanswered digital communication sent from the user account;
    transmitting a notification regarding one or more of the group of unanswered digital communications to the user account, the notification including information related to the priority values.

2. The computer-implemented method of claim 1, the group of unanswered digital communications including an email message, a calendar event, or a chat message.

3. The computer-implemented method of claim 1, the identifying being based on a receipt or transmission date of a digital communication, information regarding a sender or a recipient of the digital communication, or content of the digital communication.

4. The computer-implemented method of claim 3, the identifying comprising determining presence of direct or implicit questions in a digital communication.

5. The computer-implemented method of claim 1, further comprising obtaining access to a communication account of the user account holding digital communications of the user account, including the list of digital communications.

6. The computer-implemented method of claim 5, the determining comprising deciding, for one of the list of digital communications, whether another digital communication in the communication account is in response to the one digital communication or whether the one digital communication is to be ignored.

7. The computer-implemented method of claim 1, the group of unanswered digital communications including a digital communication sent by the user account and received no response or a digital communication received by the user account and not yet responded to.

8. The computer-implemented method of claim 1, the assigning comprising identifying a relationship strength between user accounts involved in an unanswered digital communication.

9. The computer-implemented method of claim 1, the notification including information regarding an unanswered digital communication having a top priority value in the group of unanswered digital communications or a size of the group of unanswered digital communications.

10. The computer-implemented method of claim 1, the notification being directed to a communication account of the user account as a digital communication.

11. The computer-implemented method of claim 1, transmitting the notification comprising causing a display of a folder of unanswered digital communications or an indicator of an unanswered digital communication in a listing of digital communications.

12. The computer-implemented method of claim 1, further comprising receiving a response to the notification from the user account, the response indicating that one of the group of unanswered digital communications is already resolved or to be ignored.

13. The computer-implemented method of claim 12, further comprising:
    identifying one or more features from the one unanswered digital communication indicated as resolved or ignored;
    saving the one or more features for determining whether a future digital communication is an unanswered digital communication.

14. One or more non-transitory storage media storing instructions which, when executed by one or more computing devices, cause performance of a method of managing unanswered digital communications, the method comprising:
    identifying, by a processor, a list of digital communications associated with a user account as expecting a response or a follow-up;
    determining, by the processor, a group of unanswered digital communications, from the list of digital communications, for which a response or a follow-up is still expected;
    assigning priority values to the group of unanswered digital communications,
    the priority values indicating an order of responding to the group of unanswered digital communications,
    the assigning comprising prioritizing an unanswered digital communication sent to the user account over an unanswered digital communication sent from the user account;
    transmitting a notification regarding one or more of the group of unanswered digital communications to the user account, the notification including information related to the priority values.

15. The one or more non-transitory storage media of claim 14, the identifying comprising determining presence of direct or implicit questions in a digital communication.

16. The one or more non-transitory storage media of claim 14, the method further comprising
    obtaining access to a communication account of the user account holding digital communications of the user account, including the list of digital communications,
    the determining comprising deciding, for one of the list of digital communications, whether another digital communication in the communication account is responsive to the one digital communication or whether the one digital communication can be ignored.

17. The one or more non-transitory storage media of claim 14, the assigning further comprising identifying a relationship strength between user accounts involved in an unanswered digital communication.

18. The one or more non-transitory storage media of claim 14, the notification including information regarding an unanswered digital communication having a top priority value in the group of unanswered digital communications or a size of the group of unanswered digital communications.

19. The one or more non-transitory storage media of claim 14, transmitting the notification comprising causing a display of a folder of unanswered digital communications or an indicator of an unanswered digital communication in a listing of digital communications.

* * * * *